United States Patent
Walton et al.

[11] Patent Number: 5,951,693
[45] Date of Patent: Sep. 14, 1999

[54] DATA STORAGE SYSTEM HAVING DATA RECONSTRUCTION

[75] Inventors: John K. Walton, Mendon; Eli Leshem, Brookline, both of Mass.

[73] Assignee: EMC Corporation, Hopkinton, Mass.

[21] Appl. No.: 08/941,506

[22] Filed: Sep. 29, 1997

[51] Int. Cl.[6] .................................................. G06F 11/00
[52] U.S. Cl. .................................. 714/6; 714/8; 714/770
[58] Field of Search ......................... 395/182.04, 182.05, 395/182.03; 371/40.12, 40.13, 40.4, 40.15, 48, 50.1; 714/8

[56] References Cited

U.S. PATENT DOCUMENTS

| | | | |
|---|---|---|---|
| 5,148,432 | 9/1992 | Gordon et al. | 395/182.05 |
| 5,285,451 | 2/1994 | Henson et al. | 395/182.04 |
| 5,404,361 | 4/1995 | Casorso et al. | 395/182.05 |
| 5,406,570 | 4/1995 | Berrou et al. | 371/43 |
| 5,608,891 | 3/1997 | Mizuni et al. | 395/182.04 |
| 5,848,230 | 12/1998 | Walker | 395/182.05 |

*Primary Examiner*—Ly V. Hua
*Assistant Examiner*—Pierre Eddy Elisea
*Attorney, Agent, or Firm*—Fish & Richardson PC

[57] ABSTRACT

A system and method for reconstructing data, and/or generating a parity bit for use in reconstructing data, in a data storage system having a set of disk drives and an associated redundant disk drive. The system includes a memory having an exclusive OR gate to provide an accumulated exclusive ORing of the data successively coupled thereto. The accumulated exclusive OR result is coupled to the redundant disk drive in generating the parity bit or to a replaced disk drive when reconstructing data. The system includes: a bus; a controller coupled between the bus and the disk drives; an addressable memory coupled to the bus. The memory includes: a write buffer memory having an input coupled to the bus; a read buffer memory having an output coupled to the bus; and, the exclusive OR logic unit having a pair of inputs. One input is coupled to an output of the write buffer memory and another input is coupled to the output of the read buffer memory. The exclusive OR logic unit produces at the output thereof an exclusive OR logic function between data at the pair of inputs of such logic unit. A random access memory is coupled to an output of the logic unit.

10 Claims, 3 Drawing Sheets

STORE FIRST DATA READ FROM FIRST DISK ON DATA BUS STORED IN WRITE FIFO

→ TIME

STORE FIRST DATA IN DRAM

READ FIRST DATA FROM DRAM AND STORE IN READ FIFO

STORE SECOND DATA READ FROM SECOND DRIVE ON DATA BUS STORED IN WRITE FIFO

HAVE FIRST DATA READ FROM READ FIFO AND SECOND DATA READ FROM WRITE FIFO AT INPUT TO MUX

STORE MUX OUTPUT DRAM

DATA STORAGE SYSTEM HAVING DATA RECONSTRUCTION

BACKGROUND OF THE INVENTION

This invention relates generally to data storage systems, and more particularly to data storage systems adapted to reconstruct data.

As is known in the art, large mainframe computer systems require large capacity data storage systems. These large main frame computer systems generally includes data processors which perform many operations on data introduced to the computer system through peripherals including the data storage system. The results of these operations are output to peripherals, including the storage system.

One type of data storage system is a magnetic disk storage system. Here a bank of disk drives and the main frame computer system are coupled together through an interface. The interface includes CPU, or "front end", controllers and "back end" disk controllers. The interface operates the controllers in such a way that they are transparent to the computer. That is, data is stored in, and retrieved from, the bank of disk drives in such a way that the mainframe computer system merely thinks it is operating with one mainframe memory. One such system is described in U.S. Pat. No. 5,206,939, entitled "System and Method for Disk Mapping and Data Retrieval", inventors Moshe Yansi, Natan Vishlitzky, Bruno Altersu and Daniel Castel, issued Apr. 27, 1993, and assigned to the same assignee as the present invention.

In one such system, a redundant disk drive is provided for each of a set of disk drives. This redundant disk drive stores data, i.e., a parity bit, which is generated as a result of providing an exclusive OR function on the data in each of the other disk drives in the set. If one of the disk drives in the set fails, the failed disk drive is replaced and the data in the failed disk drive is reconstructed by providing an exclusive OR function on the data in the redundant disk drive and in the non-failed ones of the set of disk drives. For example, if the system has as the set of disk drives four disk drives, A, B, C, and D, and a redundant disk drive R, and the data in the disk drives A, B, C and D is 0010, the data in the redundant disk drive R is $0\oplus 0\oplus 1\oplus 0=1$, where $\oplus$ is an exclusive OR function. Now, if disk drives B fails, for example, the data in disk drive B is reconstructed by performing the function $A\oplus C\oplus D\oplus R=B'$, here $0\oplus 1\oplus 0\oplus 1=0$, which is now written into a disk drive B' which replaced disk drive B.

In the system described above, each disk drive has associated with it exclusive OR gate logic. The process for performing the exclusive OR function among the four disk drives, A, B, C and D, as when generating the data for disk drive R, or among disk drives A, C, D, and R when generating the reconstructed data for replacement disk drive B' requires that the data be placed on the data bus eight times. In the example above, in generating the data for redundant disk drive R, the data in disk drive A is read, placed on a data bus, stored in a memory, then read from memory, placed on the data bus and written into, and exclusive ORd with, the data in disk drive B. The process repeats for disk drives B, C, D and R. Thus, as noted above, the data bus is used in this example eight times, i.e., during each of four read/write cycles. Further, the system requires special disk drives having the exclusive OR function.

SUMMARY OF THE INVENTION

In accordance with one feature of the invention, a system and method are provided for reconstructing data, and/or generating a parity bit for use in reconstructing data, in a data storage system having a set of disk drives and an associated redundant disk drive. The system includes a memory having an exclusive OR gate to provide an accumulated exclusive ORing of the data successively coupled thereto. The accumulated exclusive ORd result is coupled to the redundant disk drive in generating the parity bit or to a replaced disk drive when reconstructing data.

In accordance with another feature of the invention, a system is provided for reconstructing data, and/or generating parity bits for use in reconstructing data, in a data storage system having a set of disk drives and a associated redundant disk drive. The system includes: a bus; a controller coupled between the bus and the disk drives; an addressable memory coupled to the bus. The memory includes: a write buffer memory having an input coupled to the bus; a read buffer memory having an output coupled to the bus; and, an exclusive OR logic unit having a pair of inputs. One input is coupled to an output of the write buffer memory and another input is coupled to the output of the read buffer memory. The exclusive OR logic unit produces at the output thereof an exclusive OR logic function between data at the pair of inputs of such logic unit. A random access memory is coupled to an output of the logic unit.

The controller is adapted to: (A) have first data in one of the disk drives read therefrom, placed on the bus, and stored in the write buffer memory; (B) have such first data then written into the random access memory; (C) have such first data in the random access memory read therefrom and then stored in the read buffer memory; (D) have second data in another one of the disk drives read therefrom, placed on the bus and then stored in the write buffer memory; (E) have the first data read from the read buffer memory and the second data read from the write buffer memory appear at the pair of inputs of the logic; and (F) have the output of the logic stored in the random access memory as a third data.

BRIEF DESCRIPTION OF THE DRAWINGS

Referring now to the accompanying drawings.

DESCRIPTION OF THE PREFERRED EMBODIMENTS

Figure 1:
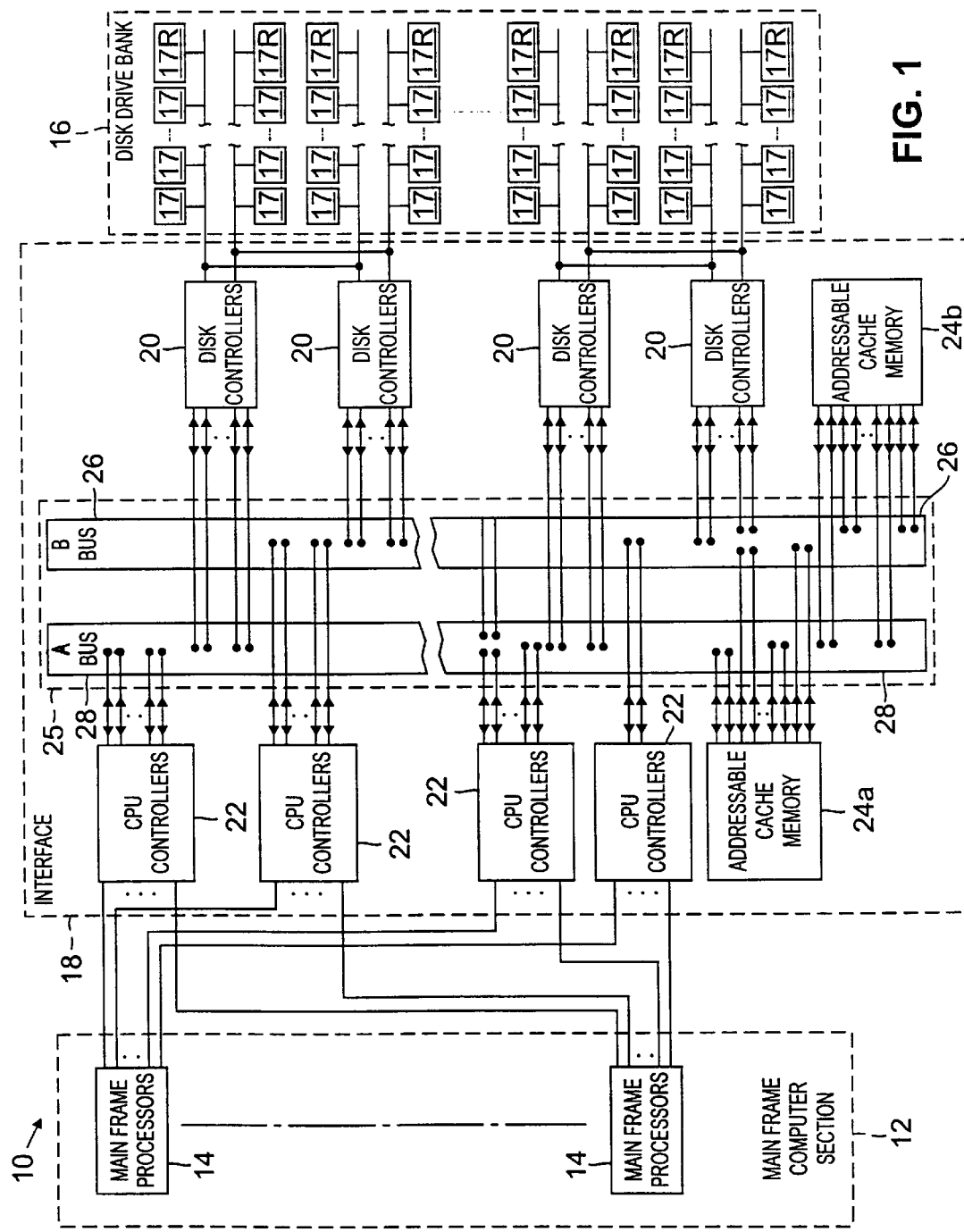
FIG. 1 is a block diagram of a computer system using a data storage system in accordance with the invention.

Referring now to FIG. 1, a computer system 10 is shown. The computer system 10 includes a main frame computer section 12 having main frame processors 14 for processing data. Portions of the processed data are stored in, and retrieved data from, a bank 16 of disk drives 17 through an interface 18. It is noted that for each of a set of disk drives 17 there is associated with such set a redundant disk drive 17R. Thus, the redundant disk drive 17R is provided for each of a set of disk drives 17. This redundant disk drive 17R stores data, i.e., a parity bit, which is generated in a manner to be described in detail in connection with FIGS. 2 and 3A–3F as a result of providing an exclusive OR function on the data in each of the other disk drives 17 in the set. If one of the disk drives 17 in the set fails, the failed disk drive is replaced and the data in the failed disk drive is reconstructed by providing an exclusive OR function on the data in the redundant disk drive 17R and in the non-failed ones of the set of disk drives 17.

The interface 18 includes disk controllers 20, central processor unit (CPU) controllers 22 and addressable cache memories 24a, 24b electrically interconnected through a bus 25, here a pair buses; i.e., an A bus 28 and a B bus 26. The cache memories 24a, 24b are hereinafter sometimes referred to only as addressable memories.

More particularly, in order to provide data integrity in case of a failure in a disk controller 20 or CPU controller 22, the pair of buses 26, 28 is provided. One portion of the disk controllers 20 is connected to one of the buses 26, 28 and the other portion of the disk controllers 20 is connected to the other one of the buses 26, 28. Likewise, one portion of the CPU controllers 22 is connected to one of the buses 26, 28 and the other portion of the CPU controllers 22 is connected to the other one of the buses 26, 28. The cache memories 24a, 24b are connected to both buses 26, 28, as shown.

Figure 2:
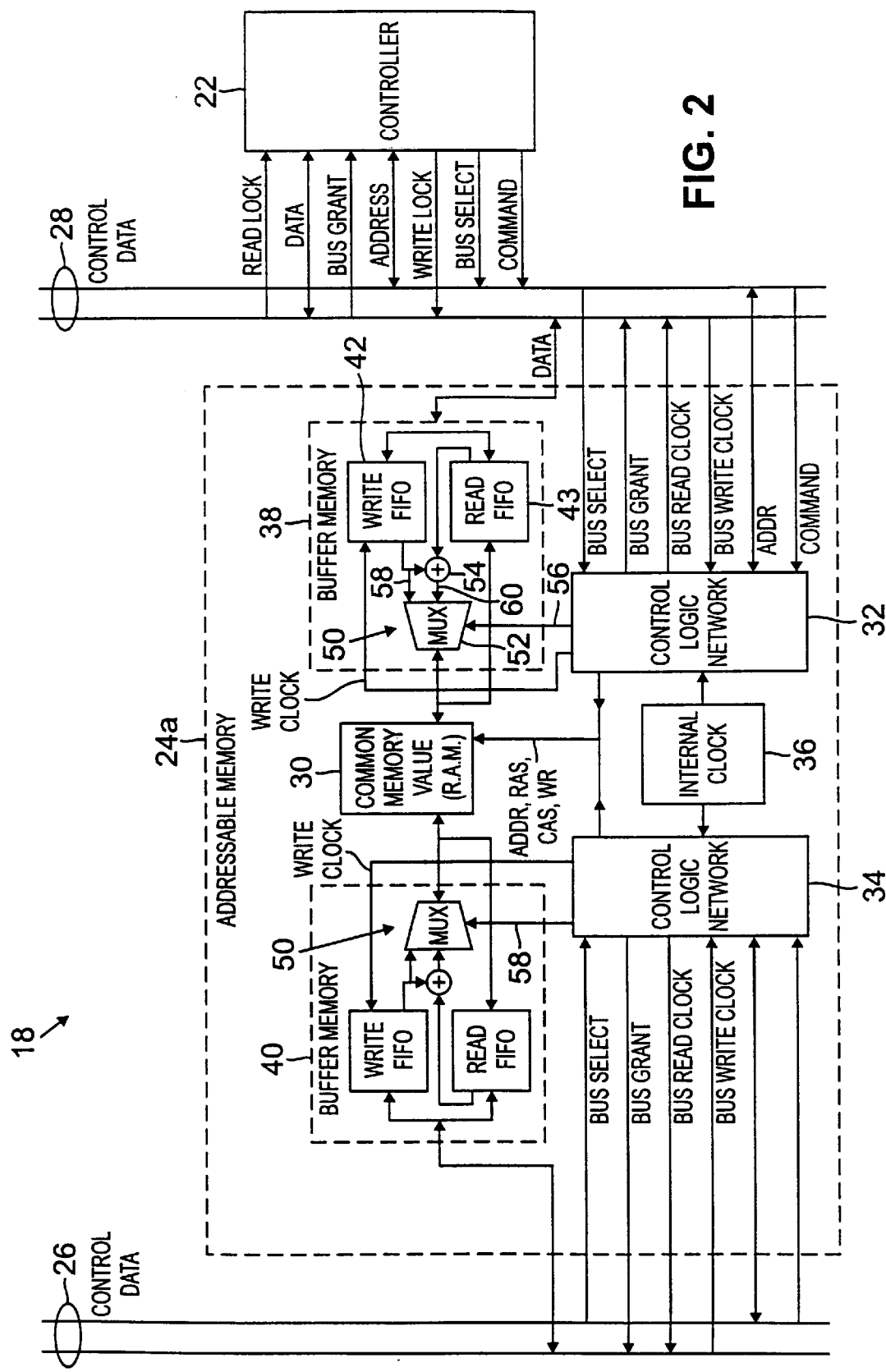
FIG. 2 is a block diagram of an interface used in the data storage system of FIG. 1, such interface providing coupling between main frame computer processors and a bank of disk storage devices according to the invention.

Referring now to FIG. 2, the interface 18, and more particularly, one of the addressable cache memories 24a, 24b, here memory 24a, is shown in detail. The addressable memory 24a includes: a random access memory (RAM) 30, here a dynamic random access memory (DRAM) adapted for coupling to bus 26 or bus 28 in response to row address select (RAS), column address select (CAS) write enable (W) and read enable (R) signals fed thereto; a pair of control logic networks 32, 34; internal clock 36; and a pair of buffer memories 38, 40, all arranged as shown. It is first noted that while the DRAM 30 is common to both buses 26, 28, control logic network 32 and buffer memory 38 are associated with bus 28 and control logic network 34 and buffer memory 40 are associated with bus 26. A token arbitration system, not shown, is provided for controlling sharing of the pair of buses 26, 28 by the common DRAM 30. One such bus arbitration system is described in co-pending patent application Ser. No. 08/534,376, "Bus Arbitration System, inventor Eli Leshem, filed Sep. 28, 1995, assigned to the same assignee as the present invention, the contents thereof being incorporated herein by reference.

Each one of the buffer memories 38, 40 includes a write first-in/first-out memory (FIFO) 42 and a read FIFO 43. Such system is described in our co-pending patent application Ser. No. 08/701,917, filed Aug. 23, 1996, entitled "Data Storage System Having Master/Slave Addressable Memories", assigned to the same assignee as the present invention, the entire subject matter thereof being incorporated herein by reference.

The write FIFO 42 of buffer memory 38 is adapted to have data written therein from the bus 28 in response to a write clock produced by the control logic network 32. The write clock produced by network 32 in response to a bus write clock produced by a controller 20, 22 on the bus 28 in a manner described in the above referenced co-pending patent application Ser. No. 08/701,917. Data stored in the DRAM 30 is supplied to bus 28 either indirectly through the read FIFO 43 of the buffer memory 38, or directly via a by-pass, not shown. In like manner, the write FIFO 42 of buffer memory 40 is adapted to have data written therein from the bus 26 in response to a write clock produced by the control logic network 34. The write clock is produced by network 34 in response to a bus write clock produced by a controller 20, 22 on the bus 26 in an equivalent manner. Data stored in the DRAM 30 is supplied to bus 26 either indirectly through the read FIFO 43 of the buffer memory 40, or directly via a by-pass, not shown. It is noted that, while the internal transfer of data among the buffer memory 40, DRAM 30 and bus 26 is controlled by control logic network 34, both control logic networks 32, 34 are synchronized with respect to each other by the internal clock 36.

It is noted that here each buffer memory 38, 40 includes XORing circuitry 50. The XORing circuitry 50 includes a multiplexer 52 and an exclusive OR logic gate 54. The multiplexer 52 is controlled by a control signal produced by the logic networks 32, 34 on lines 56, 58, respectively, as show.

Figure 3A:
FIGS. 3A–3F are timing diagrams useful in understanding the operation of a memory used in the interface to reconstruct data in accordance with the invention.
Figure 3B:
Figure 3C:
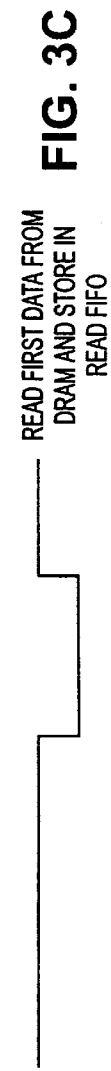
Figure 3D:
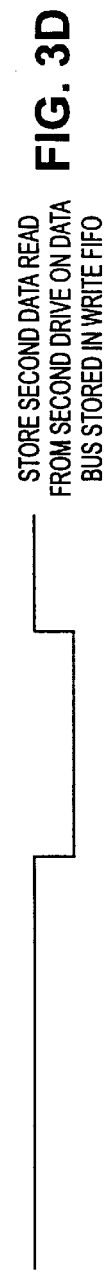
Figure 3E:
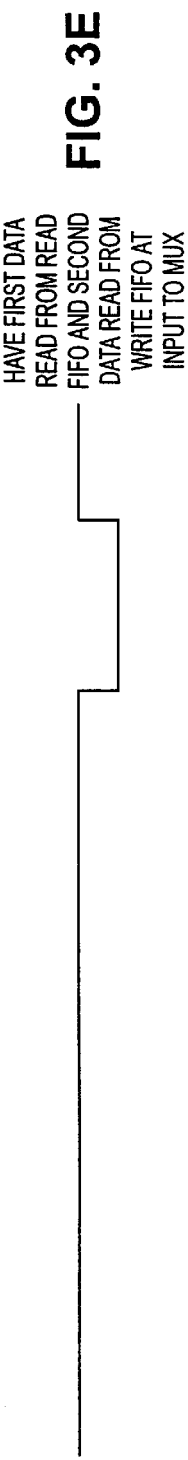
Figure 3F:
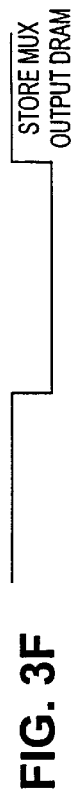

In operation, let us consider the construction of a parity bit in redundant disk drive 17R for one of the sets of disk drives 17 (FIG. 1). Considering operation of buffer memory 38, and recognizing that buffer memory 40 operates in an equivalent manner, the controller 20 operates to have first data in one of the disk drives 17 read therefrom, placed on the data bus 28, and stored in the write FIFO memory 42 during one memory operating cycle, as shown in FIG. 3A. Next, the controller 20 produce a control signal for the control logic network 32 to produce a control signal line 56, as well as other control signals described in the above-referenced co-pending patent application, to have such first data read from the write FIFO 42, pass through the multiplexer 52 and written into the random access memory (RAM) 30 during a second memory operating cycle, as shown in FIG. 3B. Next, the controller 20 operates the control logic network 32 to have such first data in the random access memory (RAM) 30 read therefrom and stored in the read FIFO memory 43 during a third memory cycle, as shown in FIG. 3C. Next, the controller 20 operates to have second data from another one of the disk drives 17 read therefrom, placed on the data bus 28, and stored in the write FIFO memory 42 during a fourth memory cycle, as shown in FIG. 3D. Next, the controller 20 operates to have the first data read from the read FIFO memory 43 and the second data read from the write FIFO memory 42 appear at a pair of inputs of the exclusive OR gate 54 and pass through the multiplexer 52 to the RAM 30 in response to control signals on 56. Next, the controller 20 operates to have the output of the exclusive OR logic gate 54, now passed to the output of multiplexer 52 (FIG. 3E). Next, the output of the multiplexer 52 is stored in the dynamic random access memory (DRAM) 30 as a third data, as shown in FIG. 3E. The third data (i.e., the exclusive OR of the first data and the second data) is stored as the first intermediate XOR result (i.e., the XOR result from a pair of disk drives 17) in the DRAM 30.

The process repeats by having the intermediate XOR result serve as the above described "first" data which was stored in the DRAM 30 and data in a third one of the disk drives 17 provide the above described "first" data. Thus, the first intermediate XOR result is XORd with the data read from the third one of the disk drives to produce a second intermediate XOR result (i.e., an accumulated XOR result) which is stored in the DRAM 30. The process repeats until the DRAM 30 stores the last intermediate XOR result (i.e., the last accumulated XOR result). The last accumulated XOR result is then read from the DRAM 30, placed on the data bus 28, and stored in the redundant disk drive as a parity bit. Thus, if for example, there are four disk drives in the set, it is noted that the data bus is used only five times: Once to place the first data from the first disk drive on the bus; next to place the second data from the second disk drive on the bus; next to place the third data from the third disk drive on the bus; next to place the fourth data from the fourth disk drive on the bus; and fifth to place the last intermediate XOR result, i.e. the redundant parity bit, on the bus for storage in the redundant disk drive 17R.

If one of the disk drives 17 in the set fails, the failed disk drive is replaced and the data stored in the failed disk drive is reconstructing the data using the redundant parity bit stored in the redundant disk drive. Here, during the data reconstructing process, the data in the redundant disk drive is used as the "first data" and the replaced disk drives now "serves" as the depository for the last intermediate XOR result. Here again, with four disk drives in the set, the data bus is used only five times.

Other embodiments are within the spirit and scope of the appended claims.

What is claimed is:

1. A system for reconstructing data, and/or generating a parity bit for use in reconstructing data, in a data storage system having a set of disk drives and an associated redundant disk drive, such system comprising:
   a memory section having:
      a write buffer memory coupled to a bus;
      a read buffer memory coupled to the bus;
      a random access memory; and,
      an exclusive OR gate having a pair of inputs, one input being coupled to an output of the write buffer memory and another input coupled to the output of the read buffer memory for producing at an output thereof an exclusive OR logic function between data at the pair of inputs of the logic unit;
   a controller coupled to the memory section and adapted to provide in the memory section an accumulated exclusive ORing of data successively coupled to the inputs of the exclusive OR gate and for coupling the accumulated exclusive OR result to the redundant disk drive in generating the parity bit or to a replaced disk drive when reconstructing data.

2. A method for reconstructing data, and/or generating a parity bit for use in reconstructing data, in a data storage system having a set of disk drives and an associated redundant disk drive, such method comprising the steps of:
   providing a memory section having:
      write buffer memory coupled to a bus;
      a read buffer memory coupled to the bus;
      a random access memory; and,
      an exclusive OR gate having a pair of inputs, one input being coupled to an output of the write buffer memory and another input coupled to the output of the read buffer memory for producing at an output thereof an exclusive OR logic function between data at the pair of inputs of the logic unit;
   producing in the memory section an accumulated exclusive ORing of data successively coupled thereto in the gate; and
   coupling an accumulated exclusive OR result to the redundant disk drive in generating the parity bit or to a replaced disk drive when reconstructing data.

3. A method for reconstructing data in a replacement for a failed disk drive in a set of disk drives, such set of disk drives having associated therewith a redundant disk drive having redundant data produced by exclusive ORing the data in the set of disk drives prior to replacement of the failed disk drive with the replaced disk drive, such method comprising the step of:
   providing a memory section having:
      a write buffer memory coupled to a bus;
      a read buffer memory coupled to the bus;
      a random access memory; and,
      an exclusive OR gate having a pair of inputs, one input being coupled to an output of the write buffer memory and another input coupled to the output of the read buffer memory for producing at an output thereof an exclusive OR logic function between data at the pair of inputs of the logic unit a random access memory and an exclusive OR gate;
   successively coupling data from the redundant disk drive and unfailed ones of the set of disk drives to the exclusive OR logic unit to produce an accumulated exclusive ORing of data successively coupled thereto; and
   coupling such accumulated exclusive ORing to the replaced failed one of disk drives.

4. A system for reconstructing data in a replacement for a failed disk drive in a set of disk drives, such set of disk drives having associated therewith a redundant disk drive having redundant data produced by exclusive ORing the data in the set of disk drives prior to replacement of the failed disk drive with the replaced disk drive, such system comprising:
   a memory system, such memory system having:
      a write buffer memory coupled to a bus;
      a read buffer memory coupled to the bus;
      a random access memory; and,
      an exclusive OR gate having a pair of inputs, one input being coupled to an output of the write buffer memory and another input coupled to the output of the read buffer memory for producing at an output thereof an exclusive OR logic function between data at the pair of inputs of the logic unit;
   a controller for successively coupling data from the redundant disk drive and unfailed ones of the set of disk drives through the memory system to the exclusive OR logic unit to produce an accumulated exclusive ORing of the data successively coupled thereto and for coupling such accumulated exclusive ORing to the replaced failed one of disk drives.

5. A data storage system, wherein computer having a processors for processing data is coupled to a bank of disk drives through an interface, such interface comprising:
   (a) a bus;
   (b) a controller coupled between the bus and the bank of disk drives;
   (c) an addressable memory coupled to the bus, such memory comprising:
      (1) a write buffer memory having an input coupled to the bus;
      (2) a read buffer memory having an output coupled to the bus;
      (3) an exclusive OR logic unit having a pair of inputs, one input being coupled to an output of the write buffer memory and another input coupled to the output of the read buffer memory for producing at the output thereof an exclusive OR logic function between data at the pair of inputs of such logic unit; and
      (4) a random access memory coupled to an output of the logic unit.

6. A data storage system comprising:
   (a) a bus;
   (b) a controller coupled between the bus and a bank of disk drives;
   (c) an addressable memory coupled to the bus, such memory comprising:
      (1) a write buffer memory having an input coupled to the bus;
      (2) a read buffer memory having an output coupled to the bus;

(3) an exclusive OR logic unit having a pair of inputs, one input being coupled to an output of the write buffer memory and another input coupled to the output of the read buffer memory for producing at the output thereof an exclusive OR logic function between data at the pair of inputs of such logic unit; and (4) a random access memory coupled to an output of the logic unit.

7. A system for reconstructing data and/or generating parity bits for use in reconstructing data in a data storage system having a set of disk drives and a redundant disk drive, such system comprising:

(a) a bus;

(b) a controller coupled between the bus and the disk drives;

(c) an addressable memory coupled to the bus, such memory comprising:

(1) a write buffer memory having an input coupled to the bus;

(2) a read buffer memory having an output coupled to the bus;

(3) an exclusive OR logic unit having a pair of inputs, one input being coupled to an output of the write buffer memory and another input coupled to the output of the read buffer memory for producing at the output thereof an exclusive OR logic function between data at the pair of inputs of such logic unit; and (4) a random access memory coupled to an output of the logic unit.

8. A system for reconstructing data and/or generating parity bits for use in reconstructing data in a data storage system having a set of disk drives and a redundant disk drive, such system comprising:

(a) a bus;

(b) a controller coupled between the bus and the disk drives;

(c) an addressable memory coupled to the bus, such memory comprising: (1) a write buffer memory having an input coupled to the bus; (2) a read buffer memory having an output coupled to the bus; (3) an exclusive OR logic unit having a pair of inputs, one input being coupled to an output of the write buffer memory and another input coupled to the output of the read buffer memory for producing at the output thereof an exclusive OR logic function between data at the pair of inputs of such logic unit; and (4) a random access memory coupled to an output of the logic unit; and (d) wherein such controller is adapted to: (A) have first data in one of the disk drives read therefrom, placed on the bus and stored in the write buffer memory; (B) have such first data then written into the random access memory; (C) have such first data in the random access memory then read therefrom and stored in the read buffer memory; (D) have second data in another one of the disk drives read therefrom, placed on the bus, and then stored in the write buffer; (E) have the first data read from the read buffer memory and the second data read from the write buffer memory appear at the pair of inputs of the logic; and (F) have the output of the logic then stored in the random access memory as a third data.

9. A data storage system, wherein a computer having processors for processing data is coupled to a bank of disk drives through an interface, such interface comprising:

(a) a bus;

(b) a controller coupled between the bus and the bank of disk drives;

(c) an addressable memory coupled to the bus, such memory comprising:

(1) a write buffer memory having an input coupled to the bus;

(2) a read buffer memory having an output coupled to the bus;

(3) an exclusive OR logic unit having a pair of inputs, one input being coupled to an output of the write buffer memory and another input coupled to the output of the read buffer memory for producing at the output thereof an exclusive OR logic function between data at the pair of inputs of such logic unit;

(4) a random access memory coupled to an output of the logic unit; and (d) wherein the controller is adapted to have (A) first data in one of the disk drives read therefrom, placed on the bus and stored in the write buffer memory during one memory operating cycle; (B) have such first data written into the random access memory during a second memory operating cycle; (C) have such first data in the random access memory read therefrom and stored in the read buffer memory during a third memory cycle: (D) have second data in another one of the disk drives read therefrom, placed on the bus and stored in the write buffer memory during a fourth memory cycle; (E) have the first data read from the read buffer memory and the second data read from the write buffer memory appear at the pair of inputs of the logic; (F) and have the output of the logic stored in the random access memory as a third data.

10. A data storage system wherein a computer section having processors for processing data coupled to a bank of disk drives through an interface, such system being adapted to reconstruct data, and/or generate a parity bit for use in reconstructing data, such bank of disk drives having an associated redundant disk drive, such interface comprising:

(a) a bus;

(b) a plurality of addressable cache memories coupled to the bus, one of the cache memories comprising a memory section having a random access memory and an exclusive OR gate; and (c) a controller coupled to the memory section and the bus, such controller being adapted to provide in the memory section an accumulated exclusive ORing of data successively coupled to the exclusive OR gate and for coupling the accumulated exclusive OR result to the redundant disk drive in generating the parity bit or to a replaced disk drive when reconstructing data.

* * * * *